Sept. 5, 1939.  P. B. HOYE  2,172,201
SWITCH
Filed July 26, 1937  7 Sheets-Sheet 1

Inventor:
Peder B. Hoye
By:
Attys.

Inventor:
Peder B. Hoye

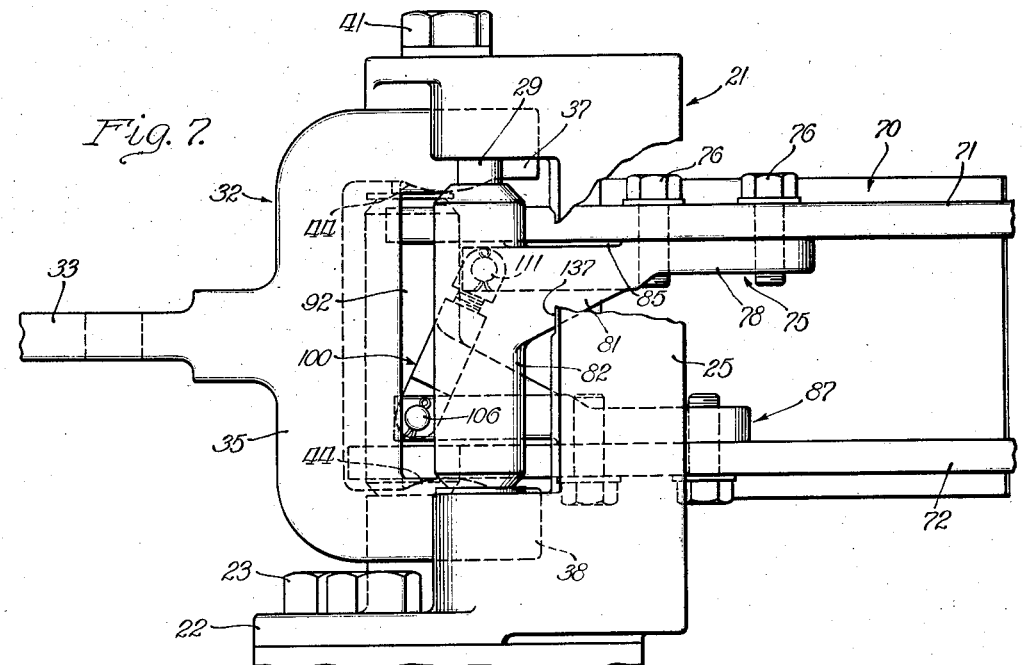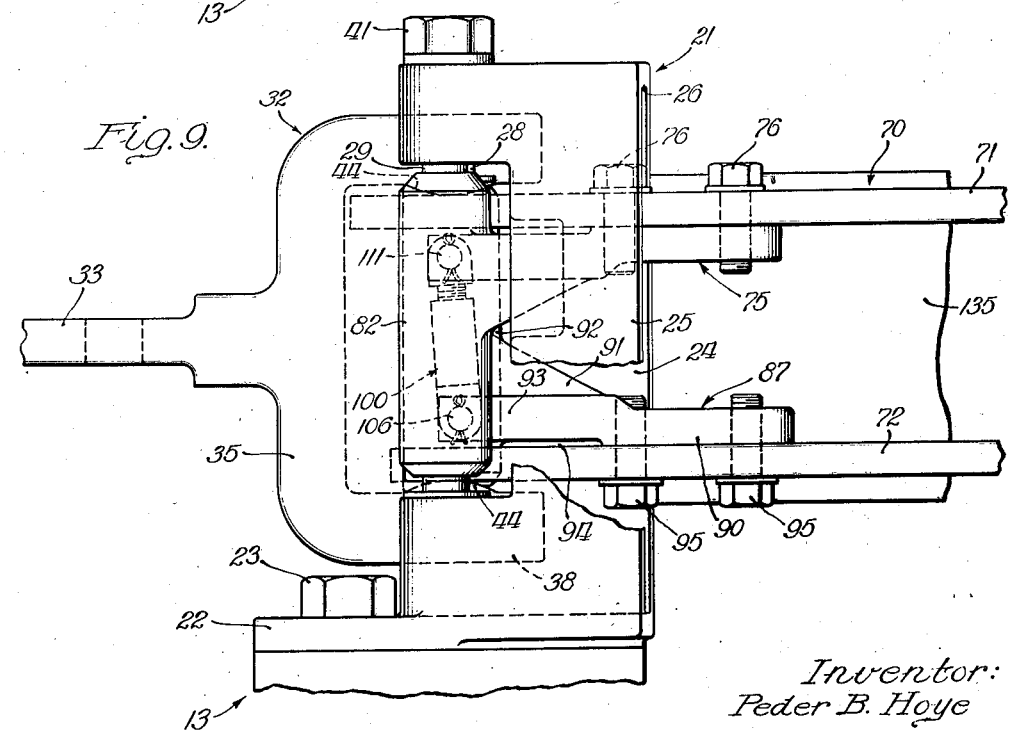

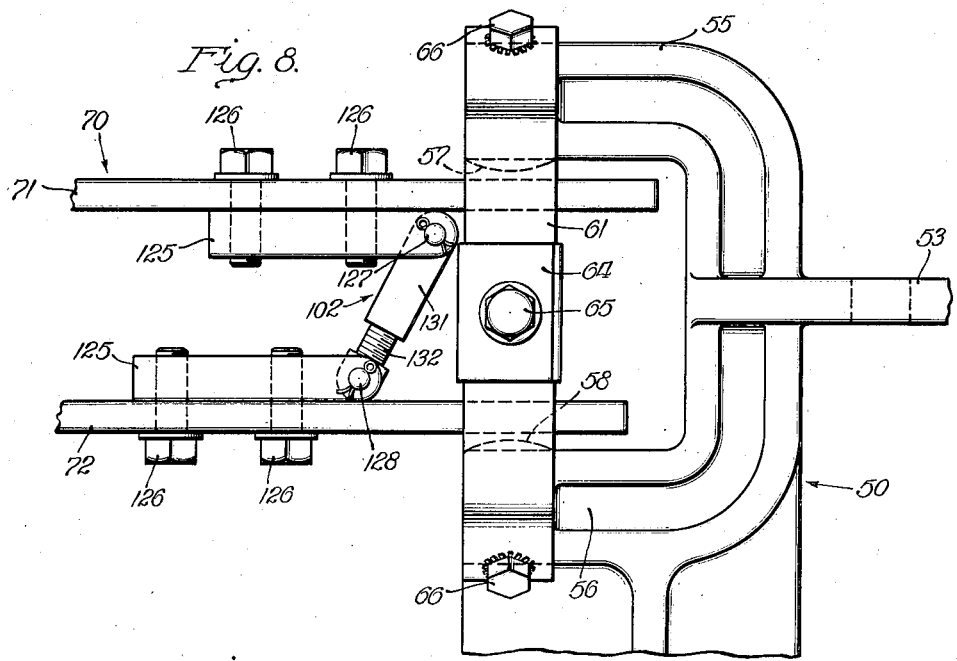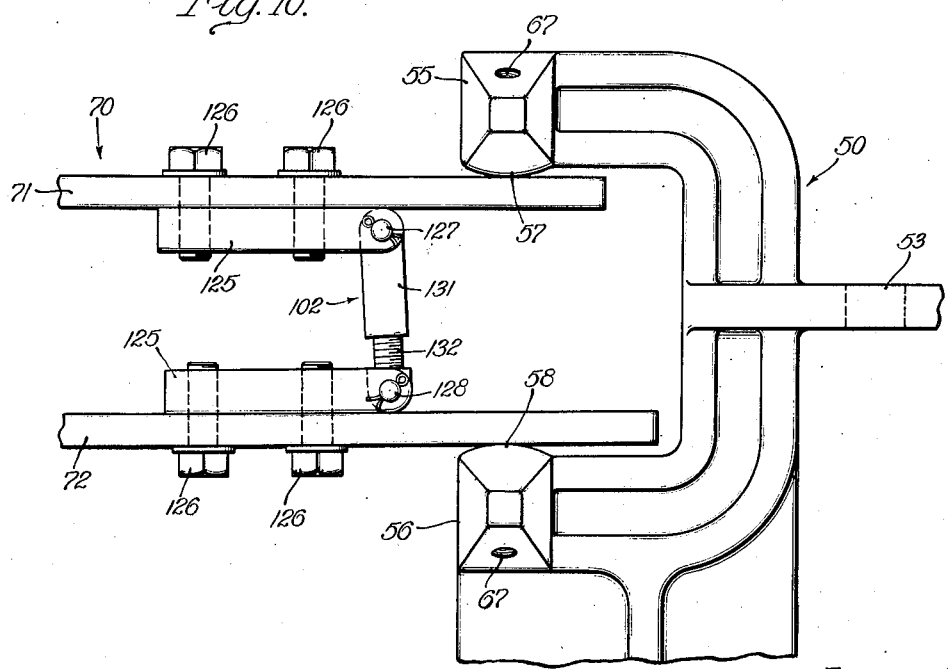

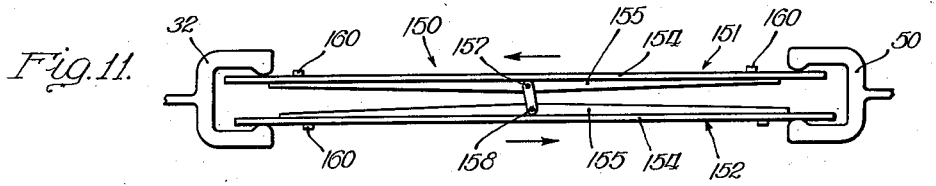
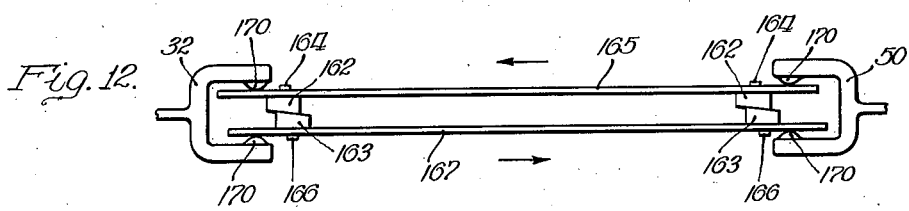
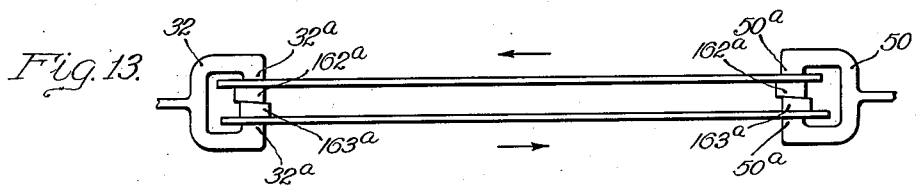
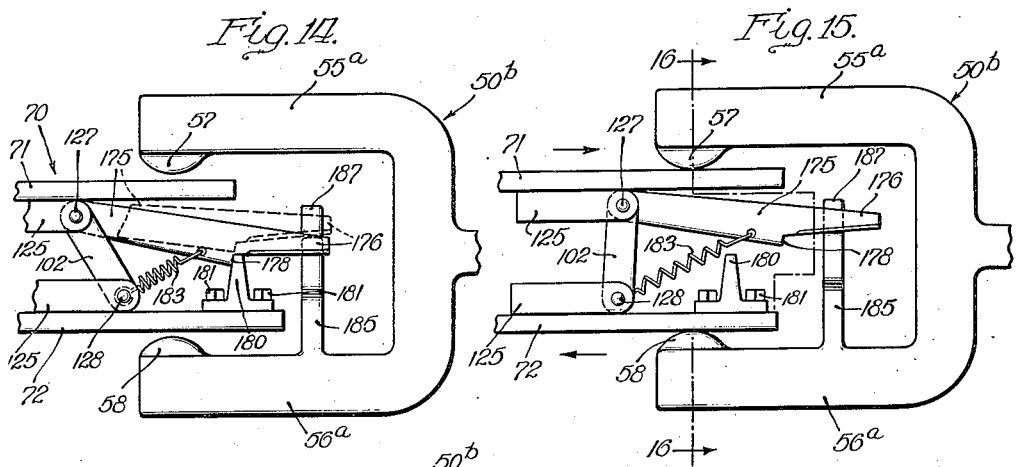
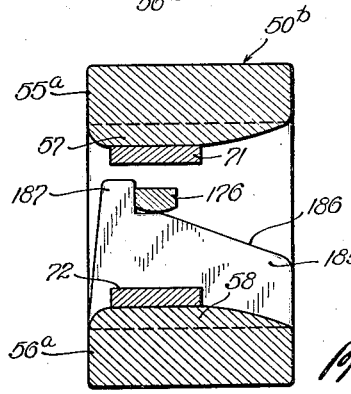

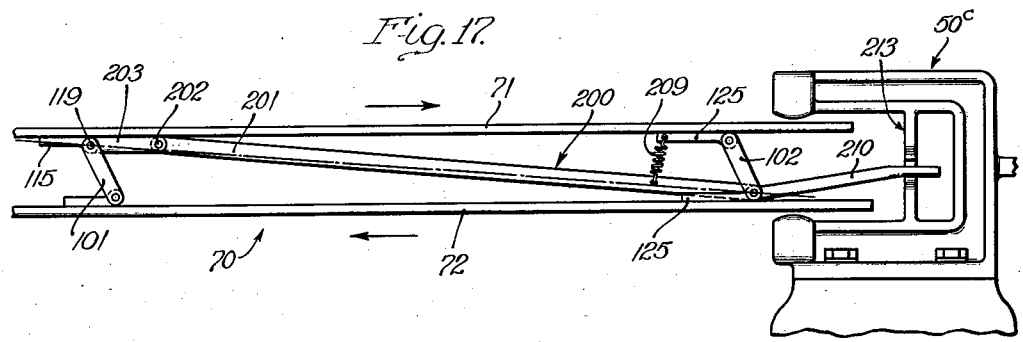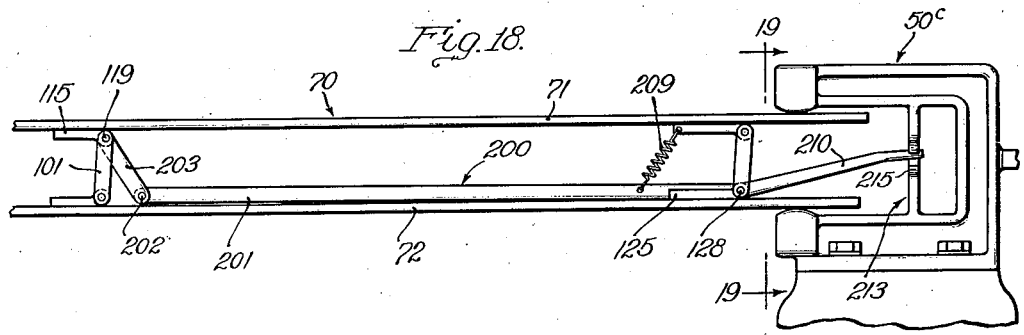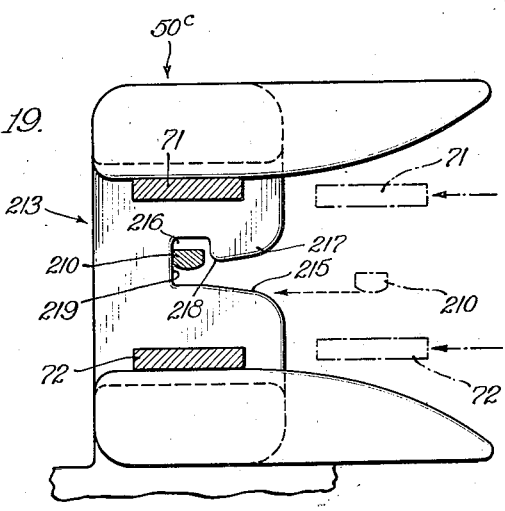

Patented Sept. 5, 1939

2,172,201

UNITED STATES PATENT OFFICE 2,172,201

SWITCH

Peder B. Hoye, Maywood, Ill., assignor to Electrical Engineers Equipment Company, Melrose Park, Ill., a corporation of Illinois Application July 26, 1937, Serial No. 155,633

14 Claims. (Cl. 200—48)

This invention relates to electric switches in general, and more particularly to such switches as are used for disconnect purposes under conditions of large currents and high voltages.

The principal object of the present invention is the provision of a switch having a blade unit in which two or more blades have movement relative to each other and to the associated contact or contacts, so as to secure a sliding high pressure engagement. A further object of the present invention is to provide a wiping high pressure contact without imposing any large amount of thrust on the insulator stacks, and preferably this is done by moving the blades relative to one another after they are in position relative to the stationary contacts. Further, it is an object of the present invention to provide a switch in which the blades are moved relative to one another and relative to the respective contact members in parallel or approximately parallel planes, either laterally or longitudinally of one another.

A further object of my invention is the provision of a switch having two or more blades which are moved relative to one another and simultaneously therewith are forced, either by spreading or contracting the blades, into a firm high pressure contact with the associated parts. Also, it is an object of my invention to secure the spreading or contracting by any suitable means, such as toggles, cams, wedges or the like. An additional object of my invention is to expand or contract the blade unit after it is in engagement with the cooperating contact member, by means that is spaced from the zones of contact between the switch blade unit and the stationary contact unit, whereby the resiliency of the blades are relied upon to complete the desired high pressure between the cooperating contacts when the switch is engaged or closed.

A further object of the present invention is the provision of a switch that comprises a stationary contact member having a pair of arms and a rotatable member carrying a pair of spaced switch blades pivoted to the rotatable member in off-center relation, in connection with yieldable means for causing the switch blades to rotate with the rotatable member until the switch blades are in position in the stationary contact member, whereupon continued rotation of the rotatable member acts through said off-center pivots for shifting said blades relative to one another and, simultaneously therewith, forcing the blades outwardly into firm pressure contact with the stationary contact member.

These and other objects and advantages of the present invention will be apparent to those skilled in the art after a consideration of the following detailed description, taken in conjunction with the accompanying drawings illustrating one structural embodiment of the present invention.

Figures 7 and 8, taken together, constitute a fragmentary side view of the blade unit when the outer end has been swung into position in the stationary contact but before the rotation of the insulator stack has been completed to expand and lock the blade sections;

Figures 9 and 10, taken together, show the parts after the rotation of the insulator stack has been completed and the switch blade unit expanded and locked in position;

Figure 11 is a fragmentary view showing the use of switch blades of composite construction;

Figures 12 and 13 are views similar to Figure 11 but show the use of wedges or cams instead of toggles;

Figure 14 is a view similar to Figure 8, and shows a latch for positively holding the blades relaxed until they are in the proper position within the stationary contact;

Figure 15 shows the means for disengaging the lath after the switch blade unit is swung into position;

Figure 16 is a section taken along the line 16—16 of Figure 15 and shows the position of the latch after the blades have been forced into tight engagement with the stationary contact;

Figures 17 and 18 show a modified form of latch employing a toggle lever; and

Figure 19 shows the cam for operating the toggle latch.

Figure 1:
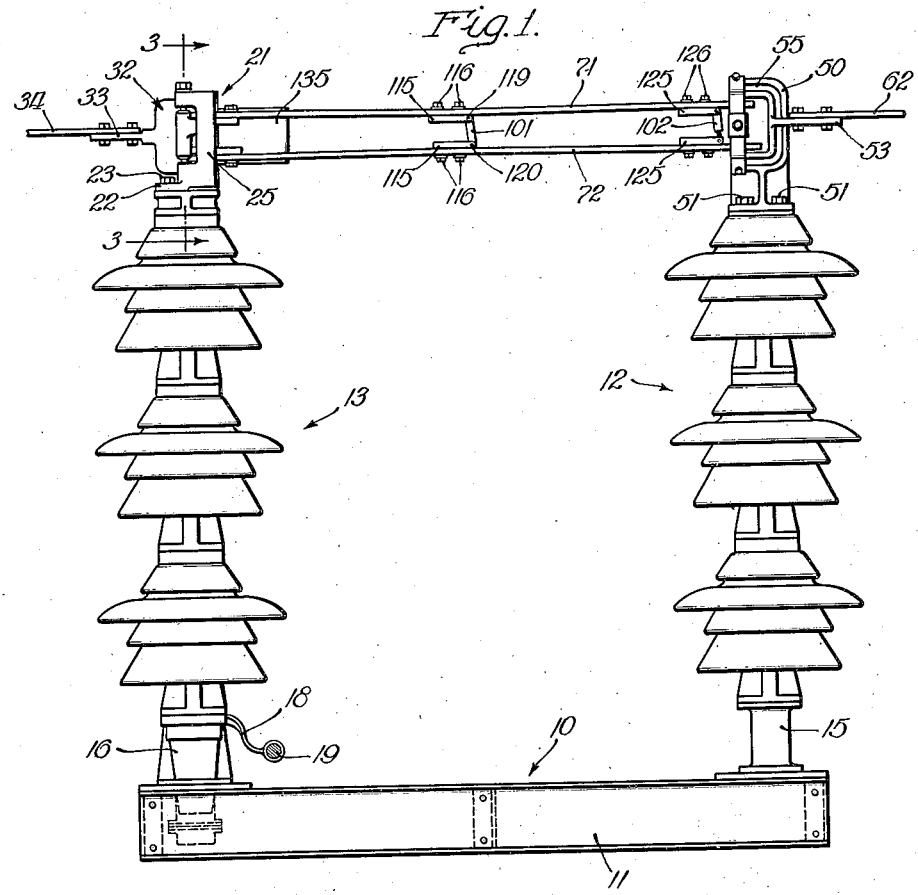
Figure 1 is a side view of a switch unit constructed according to the principles of the present invention.

Referring now more particularly to Figure 1, which illustrates an entire switch assembly embodying the present invention, the reference numeral 10 indicates a base of standard construction, usually comprising a pair of outwardly facing channel sections 11, upon which two insulator stacks 12 and 13 are mounted. The insulator stack 12 is stationary and is rigidly supported with reference to the frame 10 by any suitable means, such as a support 15 bolted to the two upper flanges of the channels 11. The other insulator 13 is rotatably mounted upon the frame 10 by means of a bearing structure 16 of any preferred form permitting rotation of the insulator stack. The insulator 13 is adapted to be oscillated through a limited angle to actuate the switch to the open or closed position, and for this purpose there is provided a crank 18 which is suitably secured to the rotatable structure and which is adapted to be oscillated by means of a rod 19 that is to be reciprocated for swinging the insulator. The actuating rod 19 is adapted to be moved in a manner well known in the art.

The switch shown in Figure 1 is generally mounted for gang operation, there usually being three such switches. The three switches are generally mounted side by side and the actuating rod 19 extends through all of the switches and is connected to each of them. Switches for operation in this manner are well known in the art, so that, so far as the present invention is concerned, a description of one of the switch units will suffice.

The upper end of the revolving insulator 13 carries a switch blade support 21 in the form of a bracket having a base 22 bolted or otherwise fastened to the top of the insulator stack 13, as at 23. The blade support 21 includes side bars 24 and 25 joined together at the top by a connecting section 26. At opposite sides the blade support carries two vertical pins 28 and 29 to which the blades are pivoted, as will be referred to later. A stationary terminal 32 is mounted at the upper end of the insulator stack 13 and includes a lug 33 arranged to receive a cable or bar 34, the stationary terminal also including a yoke section 35 terminating in a pair of contact arms 37 and 38. These arms are apertured to receive upper and lower pivot pins or studs 41 and 42 by which the terminal 32 accommodates the rotary movement of the insulator 13. The inner side of each of the contact arms 37 and 38 is provided with a rounded contact face 44.

At the upper end of the other insulator stack 12 a stationary contact member 50 is securely fixed, as by bolts 51 or the like. The stationary contact member 50 is preferably in the form of a generally U-shaped member having a cable receiving lug 53 and a pair of contact arms 55 and 56 having inwardly disposed contact faces 57 and 58, respectively. A stop member 60, which may be of rubber or other suitable material, is fastened to the stationary contact member 50 in any suitable manner, as by a strap 61 or any other suitable means. A cable 62 is adapted to be fastened to the lug 53 in substantially the same manner that the cable 34 at the other end of the switch is fastened to the lug 33 on the stationary terminal 32. The stop 60 is held to the strap 61 by a clamp 64 which is bolted, as at 65, to the strap 61, and the latter is fastened by cap screws 66 to the contact arms 55 and 56. The cap screws 66 are received in threaded openings 67 (Figure 10), formed in the arms 55 and 56. The bumper or stop 60 may be placed on either side of the stationary contact 50, as conditions may require.

Figure 3:
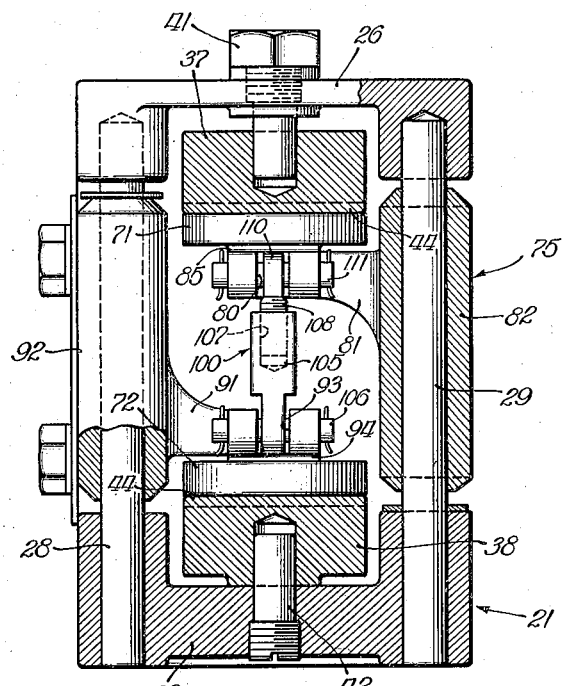
Figure 3 is a section taken at an enlarged scale along the plane of the lines 3—3 of Figures 1 and 2.

The blade unit 70 of the switch consists of two horizontally disposed vertically spaced switch blades 71 and 72 pivoted at their inner ends to the blade support 21 and adapted in the closed position of the switch to be disposed between the contact arms 55 and 56 of the stationary contact member 50. A blade bearing or bracket 75 is bolted at 76 to the inner end of the upper switch blade 71, and the blade bearing 75 includes a blade receiving arm 78 apertured to receive the bolts 76 and bifurcated at its rear end, as at 80 in Figure 5, to receive one end of the associated toggle link, as will be described later. An outwardly extending lug 81 is formed integral with the blade receiving section 78 and at its end carries an elongated sleeve 82 which is eccentrically disposed relative to the longitudinal axis of the blade 71 carried on the bearing section 78. As best shown in Figure 3, the sleeve 82 of the blade bearing bracket 75 is mounted for both pivotal and sliding movement on the pin 29, there being appreciable clearance between the upper and lower ends of the sleeve section 82 and the upper and lower portions of the blade support 21. As indicated at 85, the section 78 of the blade receiving bracket is extended longitudinally of the blade so as to provide a clearance at the innermost end of the blade so that the end thereof may flex a certain amount.

The bearing bracket for the lower switch blade 72 is indicated at 87. Preferably the bearing bracket 87 is identical with the bearing bracket 75, and includes an arm 90 to receive the blade 72, a lug 91, and a vertically disposed pivot sleeve 92 formed integrally therewith. The blade bearing 75 for the upper blade 71 is mounted with the longer portion of the sleeve 82 disposed downwardly while the blade bearing 87 for the lower switch blade 72 is mounted with the longer portion of the pivot sleeve 92 extending upwardly in order to accommodate the vertical spacing of the blades. The blade bearing 87 for the lower blade 92 also includes a bifurcated portion 93 to receive an extending toggle. It will also be noted that there is a certain amount of clearance 94 between the innermost end of the blade 72 and the adjacent portions of the blade bearing bracket to which the inner end of the blade 72 is bolted, as at 95.

A plurality of toggle links 100, 101 and 102 are connected between the upper and lower switch blades 71 and 72. The toggle link 100 is connected between the bifurcated portions 80 and 93 of the blade bearing members 75 and 87, and the toggle link 100 consists of a member 105 having one end apertured and receiving a pin 106 that extends through registering openings formed in the bifurcated section 93 of the blade bearing bracket 87. The member 105 includes a threaded longitudinal aperture 107 in which the threaded shank 108 of a trunnion member 110 is screwed. The head of the member 110 is apertured to receive a pin 111 that passes through the registering apertures formed in the bifurcated section 80 of the other blade bearing bracket 75. The toggle member 101 in the central portion of the blade unit 70 is of somewhat simpler construction, lacking the adjustable feature afforded by the threaded connection between the members 107 and 110 making up the inner toggle link 100. A bracket 115 (Figure 1) is bolted, as at 116, to each of the blades 71 and 72 in the central portion thereof, and each bracket 115 includes a pair of ears between which the toggle link 101 is pivoted on pins 119 and 120. The other toggle member 102 is similar to the inner toggle member 100 described above, and consists of a pair of brackets 125 bolted, as at 126, and carrying pins 127 and 128 on which the threadedly connected members 131 and 132, making up the toggle link 102, are pivoted. An interlocking spring 135 is fastened, as at 136, to the blade support member 21 and bears at its outer end against the edges of the switch blades 71 and 72. The spring 135 is capable of exerting sufficient force for normally holding the blades in the angular position relative to the blade support 21 shown in Figure 5, with one edge of the lug 81 up against an edge 137 of the side 25 of the blade support 21. The lug 81 and the edge 137 thus serve as stop means for limiting movement in one direction of the blade unit 70 relative to the part that supports it.

Figure 2:
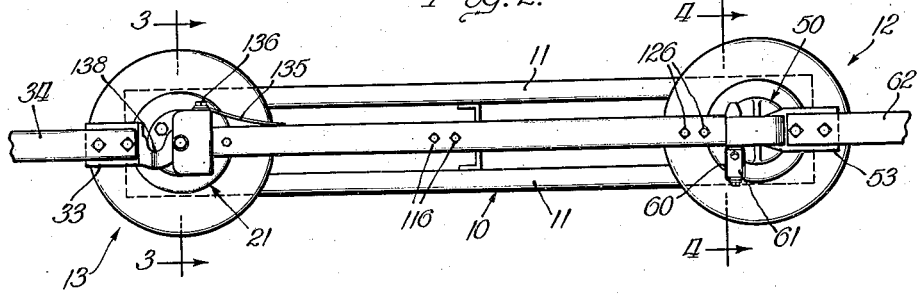
Figure 2 is a top view of the switch unit shown in Figure 1.
Figure 5:
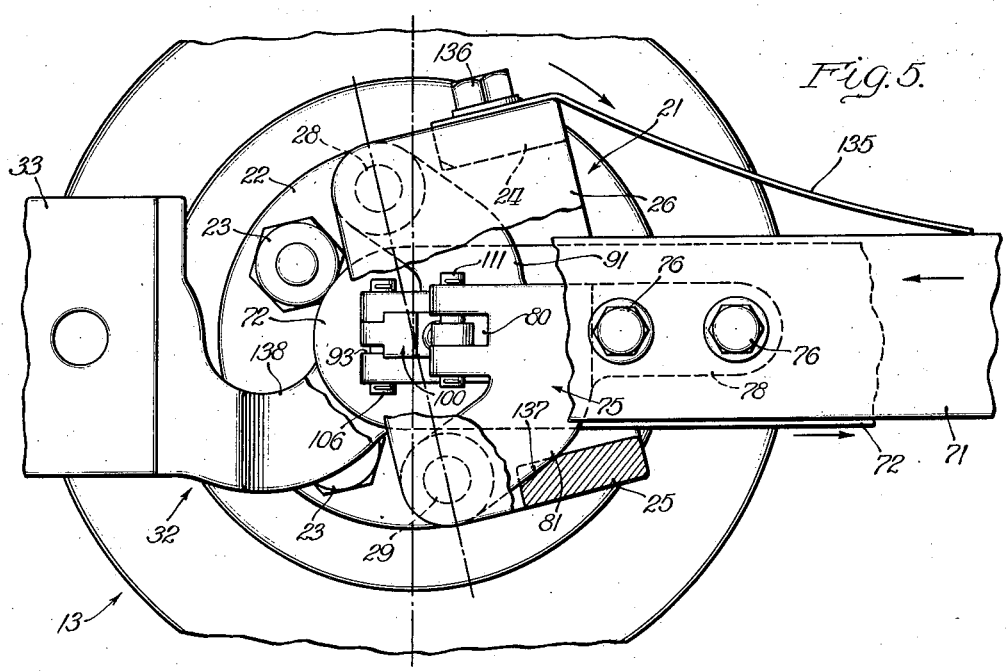
Figure 5 is an enlarged fragmentary plan view of the rotatable insulator stack and the pivoted end of the blade unit when these parts are in a position in which the blade unit has been brought into place in the stationary contact but before the insulator stack has been rotated to expand the blade sections into high pressure engagement with the associated stationary contacts.
Figure 6:
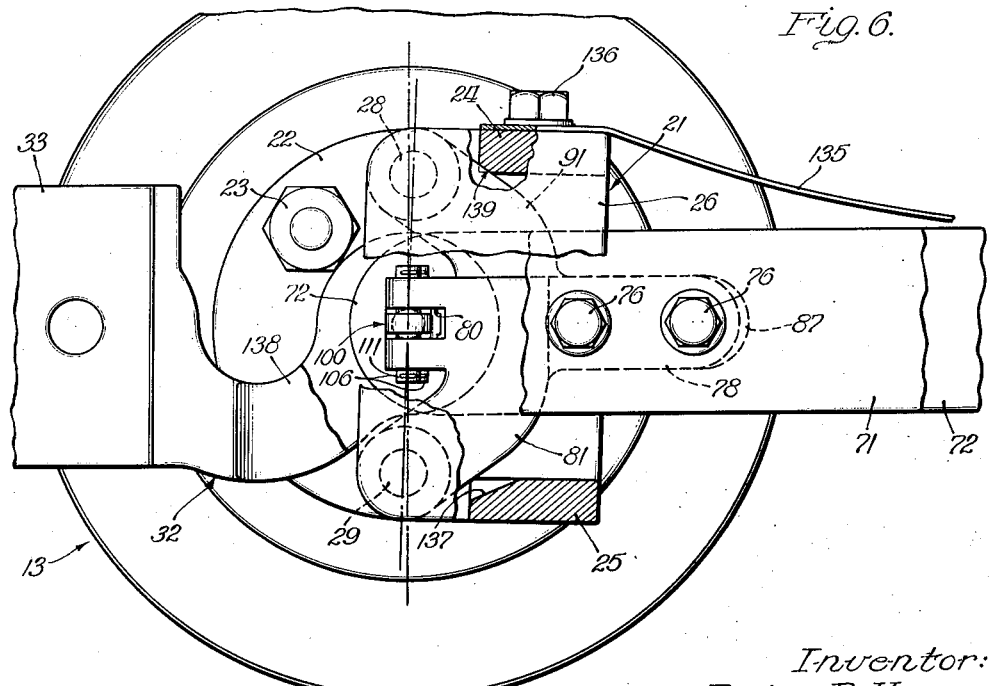
Figure 6 is a view similar to Figure 5 but showing the position of the rotatable insulator stack and blade support when the blades have been expanded.

The operation of the switch described above is substantially as follows:

When the switch is open, the switch blade 70 is turned away from the stationary contact member 50 so as to provide a wide separation between these parts, the contact member 32 being notched at 138 (Figures 2 and 6) to receive the sleeve 92 of the blade bracket 87 so as to permit the switch blade unit to be turned to a position substantially at right angles to its closed position (Figure 6). When the switch is open the pins 28 and 29 and the blade bearing brackets 75 and 87 are so arranged that the spring 135 holds the blades 71 and 72 up against the edge of the blade support 21, and in this position the toggles 100, 101 and 102 are relaxed (Figures 7 and 8) so that the switch blades 71 and 72 are drawn vertically toward each other. When it is desired to close the switch the lever 18 is actuated through the rod 19 or any other suitable means to turn the rotatable insulator 13, and since the spring 135 holds the blade unit up against its associated stop means 81—137 (Figure 5), the insulator 13 and the blade unit 70 swing bodily together until the blades, in their relaxed position, pass in between the arms 55 and 56 and engage the stop or bumper 60 (Figure 8). When the blades reach this position they can, of course, swing no farther with the insulator stack 13, whereupon continued rotation of the insulator 13 will cause the blade support 21 to move angularly in the direction of the arrow in Figure 5 relative to the blade, until the edge 139 (Figure 6) of the side 24 of the blade support comes up against the lug 91 of the lower blade bracket 87, this relative movement increasing the tension of the spring 135. Since the pivot pins 28 and 29 are disposed on opposite sides of the axis of rotation of the member 13, one of the blades will be thrust outwardly while the other will be drawn inwardly, as indicated by the arrows in Figure 5. This relative movement of one switch blade with respect to the other serves three important purposes. First, the two switch blades move with respect to the contact members 32 and 50 with a sliding or scraping action. Second, the toggle links 100, 101 and 102 spread the blades so as to increase the pressure with which they bear against the contacts 44 on the member 32 and the contact faces 57 and 58 on the member 50. Third, the shifting of the blades 71 and 72 moves the toggle links slightly past a dead center position so that they cooperate with the stop 139 to hold the blades locked in expanded position. Forcing the blades in this manner against the yoke 32 eliminates the necessity for any shunting braid or the like at the hinge end of the blade unit. Also, since one blade moves in one direction relative to the stationary contact and the other blade moves in the other direction, the force of the thrust is not imposed on the insulator stack carrying the stationary contact, and hence there is no tendency to fracture the stack, or to draw the stacks together or force them apart.

If desired, the blades 71 and 72 may be arranged to embrace a contact member on opposite sides thereof and the links 100, 101, and 102 disposed so as to contract the blades against the contact member.

It will also be noted that at the outer end of the switch blade unit the toggle 102 is disposed in a position spaced from the zones of contact between the outer ends of the switch blades 71 and 72 and the associated contact surfaces 57 and 58. Similarly, while the inner toggle link 100 is substantially in line with the axis of rotation of the member 13, the point of application of the applied force, originating by virtue of the toggle link 100, is active against the inner ends of the blades 71 and 72 in the neighborhood of the attaching bolt 76, which is spaced from the zone of contact between the section 44 of the terminal yoke 35 and the inner ends of the blades 71 and 72. Thus, the resiliency of the blade ends is relied upon to supply the high pressure contact at these points. It will be observed, however, that by virtue of the spring 135 the blade unit 70 swings bodily with the revolvable insulator stack 13 until the blade is in position with respect to the stationary contact. Thereafter, continued rotation of the insulator 13 expands and shifts the blades with respect to the cooperating contacts at each end thereof.

When the blade is to be opened the reverse operation takes place. The actuating rod 19 acts through the arm 18 to rock or rotate the insulator stack 13 in the other direction, but due, first, to the friction of the tightly engaged contact blades at the stationary contact end of the unit and, second, due to the tension in the spring 135, the first angular movement of the stack 13 swings the blade support 21 relative to the blades 71 and 72. Due to the eccentric or offset pivots of the blades 71 and 72 the blades are first shifted longitudinally of one another to unlock the toggles and break the high pressure contact at the ends of the blades with a sliding or shifting action, and then when the blades come up against the associated stop section 137 of the blade support 21, the blade unit 70 swings bodily with the insulator 13 into an open circuit position.

Figures 11, 12 and 13 illustrate modified forms of the present invention, and for convenience in illustrating these modified forms, the switch blades are shown in their closed or engaged position relative to the associated contacts, but the insulator stacks and operating mechanism for swinging the blade unit have been omitted.

Referring now to Figure 11, the swingable blade unit is indicated in its entirety by the reference numeral 150 and comprises two blades 151 and 152 of composite construction. Each blade consists of a bar 154, formed of copper or other conducting material, and a backing and reenforcing member 155 of any suitable material. If desired the hinge sections 75 and 87 (Figure 7) may be formed integral with the reenforcing sections 155. One advantage of the construction shown in Figure 11 is that the connecting bars 154 may be desired to carry the rated capacity of current and the sections 155 chosen to supply the required mechanical strength. This arrangement is an admirable one for use where the switch blade 150 is relatively long and in any other situation where the conducting sections 154 may be sufficient to carry the rated current but may not be sufficient to supply the required mechanical strength. In Figure 11 only one toggle, indicated at 156, is necessary, the toggle 156 being pivoted, as at 157 and 158, to the strengthening bars 154 at an intermediate point. Preferably, although not necessarily, the conducting bars 154 are bolted, as at 160, to the strengthening bars 155, but the latter do not extend outwardly as far as the cooperating contact sections of the stationary contact yokes 32 and 50. Thus, the resiliency of the blades 154 is utilized in securing the desired high pressure contact when the operation of the blade unit 150 causes the blades 151 and 152 to shift longitudinally and to be extended thereby under the action of the toggle link 156.

Figure 12 illustrates a construction in which the two blade sections are expanded into high pressure contact with the associated stationary contact members 32 and 50 by means of two pairs of wedges or cams 162 and 163, the wedges or cams 162 being bolted, as at 164, to the associated blade 165, while the other wedge or cam members 163 are bolted, as at 166, to the other blade 167. In the modification shown in this figure, the stationary yokes 32 and 50 are provided with rounded buttons 170, instead of the elongated cylindrical sections 44, 57 and 58 described above in connection with Figures 7 and 8. It will also be noted that the wedges or cams are fastened to the blades at points spaced from the ends of the blades which engage the contact buttons 170. The latter afford a theoretically point contact between the blade unit and the stationary contacts, while the operation of the blade unit shown in Figure 12 causes one blade to shift relative to the other, as indicated by the arrows, in moving to their closed or expanded position, as shown.

The form of the invention shown in Figure 13 is similar to that shown in Figure 12 except that the stationary contact yokes 32 and 50 are provided with flattened sections 32a and 50a, respectively, and the wedges 162a and 163a are disposed substantially in line with the flattened contact sections 32a and 50a. When the blades are shifted longitudinally of one another in the operation of the blade units, the wedges cause the blades to expand with a wiping action against the flat sections 32a and 50a, thereby providing a somewhat greater area of contact than the modifications mentioned above.

In all of the above described modifications, reliance is placed upon the spring 135 (Figure 5) for holding the switch blades in their relaxed position as the blade unit as a whole is swung into position relative to the associated stationary contact 50. As will be clear, unless the blades move relaxed into the stationary contact, difficulty might be encountered in bringing the switch blade unit into the proper position. In order to insure absolutely that the blades will be collapsed or retracted until they are in position in the associated stationary contact member, the present invention contemplates the provision of an automatically operated latch which mechanically and positively holds the switch blades in their relaxed or collapsed position until the blade unit is brought up against the stationary contact member 50. Referring now to Figures 14, 15 and 16, a latch 175 is pivoted at any suitable point on the upper blade 71, as on the pivot pin 127 and has an end 176 extending longitudinally of the blade outwardly of the ends of the blades 71 and 72. The latch lever 175 also includes a shoulder 178 which is adapted to engage the end of a lug 180 secured in any suitable manner, as by cap screws 181, to the end portion of the lower blade 72. One or more springs 183 urge the latch lever 175 down against the lug 180.

Figure 4:
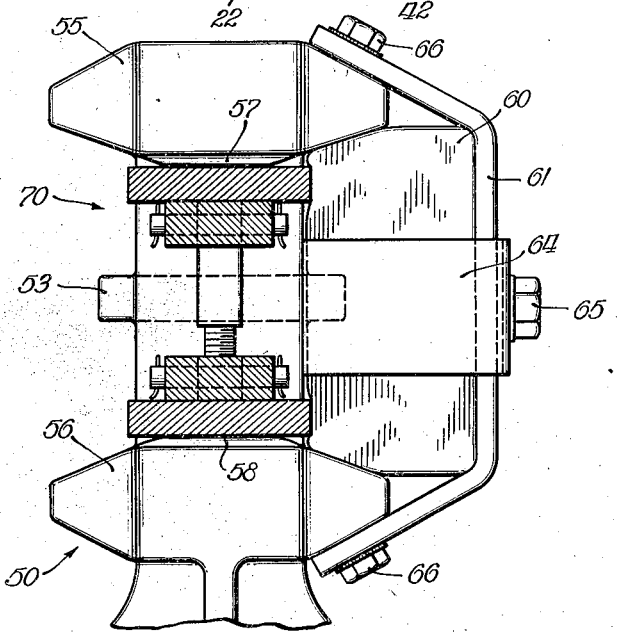
Figure 4 is a similar section taken along the lines 4—4 of Figure 2.

In this form of the invention the stationary contact member 50b is provided with somewhat longer arms 55a and 56a than the form shown in Figure 8, and the contact member 50b carries a cam plate 185, either formed integrally thereof or as a separate part fastened thereto in any manner desired. The cam plate 185, best shown in Figure 16, has one edge 186 that is angled with respect to the direction of closing movement of the blade unit 70, and the member 185 is also provided with upwardly extended section 187 against which the end 176 of the latch lever 175 is adapted to bear, thereby serving as a stop to limit the swinging movement of the blade unit 70, independently of the bumper 60 (Figure 4) with which the stationary contact 50b shown in Figures 14 and 15 may be equipped if desired.

The operation of the latch mechanism shown in Figures 14, 15 and 16 is substantially as follows:

When the switch unit 70 is being swung from an open circuit position into a position engaging the stationary contact member 50b, the blades 71 and 72 occupy the relative positions shown in Figure 14, with the springs 183 holding the latch 175 with its shoulder 178 engaging the outer end of the lug 180. The latch 175 thus holds the two blades 71 and 72, connected together by the toggles 100, 101 and 102, in retracted position until the movement of the blade unit 70 as a whole brings the end 176 of the latch lever 175 into engagement with the inclined edge 186 of the cam member 185 on the stationary contact 50b. The continued movement of the switch blade unit 70 then causes the cam 185 to raise the outer end 176 of the latch lever 175 until the shoulder 178 clears the lug 180 on the lower switch blade 72. At about the time this occurs the outer end 176 of the latch lever 175 comes up into engagement with the vertical section 187 of the cam member 185, thereby preventing the switch blade unit 70 from swinging further as a whole. In this form the hinges are so arranged that the continued movement of the rotatable insulator stack 13 then causes the upper blade 71 to move to the right and the lower blade 72 to move to the left (Figure 14), the toggles 100, 101 and 102 causing the blades to expand and to have the sliding engagement with the stationary contact arms 55a and 56a. During this movement the latch lever 175 slides idly across the edge 186 of the cam, as illustrated in Figure 15.

During the disengaging operation, the initial rotation of the insulator stack 13 first retracts the blades 71 and 72, since the blade unit 70 cannot swing away from the stationary contact member 50b as a whole due to the friction between the outer ends of the blades and the arms 65a and 66a. As the rotation of the insulator stack 13 shifts the blades 71 and 72 back to their retracted position, the shoulder 178 on the latch lever 175 drops behind the lug 180 into the position shown in Figure 14. This action is, furthermore, assisted by the spring 135 (Figures 5 and 6). After the blades 71 and 72 are retracted, they are free to swing out of the stationary contact member 50a, but the blades 71 and 72 are then held firmly in their retracted position by the engagement of the shoulder 178 on the latch lever 175 on one blade with the abutment lug of the other blade.

Figures 17, 18 and 19 illustrate the principles of the present invention as embodied in a modified form of latch lever, which is, however, similar in operation to the latch mechanism just described. In this form of the invention a toggle lever 200 is pivotally mounted on the pin 128 that connects the link 102 to the lower blade 72. One end 201 of the toggle lever 200 extends longitudinally inwardly of the blade unit and is pivoted, as at 202, to the outer end of a link 203, the inner end of which is pivoted to the pin 119 on the bracket 115 for the intermediate toggle link 101. In one position, the toggle lever 200 and the link 203 are disposed so that the pivot 202 lies slightly above a straight line connecting the pivot 119 with the pivot 128. The inner portion of the lever 200 engages the upper blade 71 in this position and serves as a stop for holding the parts 200 and 203 locked to prevent the upper blade 71 from shifting to the right (Figure 17) relative to the other blade 72. A spring 209 serves to bias the toggle 200, 203 to return to its locked position. The outer end 210 of the toggle lever 200 cooperates with a cam plate indicated in its entirety by the reference numeral 213 in locking and unlocking the toggle 200, 203. The cam plate 213 is best shown in Figure 19 and has a lower inclined cam surface 215, a central opening 216, and an upper lug 217 having a lower curved edge 218.

In operation, as the switch blade unit 70 approaches its position within the stationary contact member 50c, the end 210 of the toggle lever 200 engages the cam surface 215 so that further movement of the switch unit causes the inner end 201 of the toggle lever 200 to rock downwardly, thereby carrying the pivot 202 below the line connecting the pivots 119 and 128, thus unlocking the toggle 200, 203. The blades 71 and 72 are then free to be shifted one relative to the other. The outer ends of the blades 71 and 72 may engage a bumper, such as the one indicated at 60 in Figure 4, to limit the swinging of the blade unit 70 as a whole, or the cam plate 213 may be formed so that when the end 210 of the toggle lever comes into contact with the edge 219 (Figure 19) of the cam plate 213, further swinging of the blade unit is prevented. Movement of the blade unit as a whole in the closing direction being terminated and the toggle 200, 203 being unlocked, further rotation of the rotatable stack 13 causes the blades 71 and 72 to shift longitudinally in the direction of the arrows shown in Figure 17, thereby expanding the blades outwardly against the associated contact arms in the manner described above into the position shown in Figure 18. This relative movement of the switch blades 71 and 72 causes the toggle lever 200 to rock about the pivot 148, the corresponding movement of the end 210 being accommodated by the recess 216.

When it is desired to open the switch, the initial movement of the rotatable stack 13 first shifts the blades 71 and 72 back toward their position shown in Figure 17 and, at the same time, swings the outer end 210 of the toggle lever 200 downwardly in the recess 216. As this relaxing movement of the switch blades 71 and 72 continues, the inner end of the toggle lever 200 moves upwardly toward its locked position and the outer end continues downwardly until it can emerge from between the portions 215 and 218 of the cam plate 23. However, as the switch blade swings outwardly as a unit away from the contact member 50c, the edge 218 of the cam member 213 engages the outer end 210 of the toggle lever 200 and cooperates with the spring 209 to throw the lever 200 upwardly into its fully locked position, thereby positively holding the blades 71 and 72 retracted until such time as the unit is moved back into its closed position again and the end 210 of the toggle lever 200 engages the cam surface 215. If there should be any tendency for the switch blade unit 70 to move away from the contact member 50a before the blades are locked, the blades are prevented by the lug 217 from moving out of the contact member 50c until the lever 200 is in such a position that the end 210 can engage the edge 218. Therefore, in all cases, the switch blade 70 cannot move out of the stationary contact member 50c in its opening movement unless the switch blades 71 and 72 are locked in their relaxed position, and it will be noted that the lug 217 acts through the toggle 200, 203 to force the blades into their relaxed position before the unit leaves the stationary contact.

While I have thus shown and described above the preferred form in which I have embodied the principles of the present invention, it will be apparent that my invention is not to be limited to the specific details shown and described but that, in fact, widely different means may be employed in the practice of the broader aspects of my invention. For example, the principles of my present invention may be applied to a switch unit in which three insulator stacks are employed, one serving as an operator for the movable blade unit and mounted either at the center or at one end thereof, in conjunction with two stacks carrying stationary contact members.

I claim:

1. In an electric switch, a pair of spaced contact means, a pair of blade members of conducting material for engaging both of said contact means, means for spacing said blade means when in final closed position and acting against each of said blade members adjacent each end thereof and at points spaced from said contact means so that the inherent resilience of said blade members supplies contact pressure between said blade members and said two contact means, and actuating means for the switch operable to first release said contact pressure and thereafter move said blade members out of engagement with said contact means.

2. In a switch, in combination, a stationary contact member, a pair of spaced switch blades movable together into and out of position with respect to said stationary contact member, means acting against said switch blades for forcing them in opposite directions against said stationary member, and latch means carried by one of said switch blades and reacting against the other for restraining relative movement between both of said blades until they are in position relative to said contact member.

3. In a switch, in combination, a stationary contact member, a pair of spaced switch blades movable together into and out of position with respect to said stationary contact member, said switch blades being link-connected at their opposite ends and movable longitudinally relative to one another to shift the blades toward and away from one another, means for shifting of said switch blades longitudinally relative to one another so as to force them into firm engagement with said stationary member, latch mechanism mounted on one of said blades for locking them against relative longitudinal movement until the blades are in position relative to the contact member, and means on the latter for releasing said latch means to provide for relative longitudinal movement between the blades.

4. In a switch, a stationary contact member having a pair of spaced arms, a movable switch unit comprising a member rotatable on said stationary contact member and a pair of spaced switch blades pivoted to said rotatable member for movement relative thereto about axes disposed on opposite sides of and generally parallel to the axis of rotation of said rotatable member on said stationary contact member, a second stationary contact member, means engaging both of said switch blades for normally causing them to move bodily with said rotatable member about its axis of rotation until the outer ends of said switch blades are in position relative to said second stationary contact member, said second stationary contact member also including a pair of spaced arms disposed adjacent the ends of said switch blades opposite said second stationary contact member, and means associated with said switch blades so that continued rotation of said rotatable member after said switch blades are in position relative to said stationary contact members, will cause said switch blades to be shifted longitudinally relative to one another and to said contact members and simultaneously forced into engagement with the arms of said associated contact members at opposite ends of said switch blades.

5. In a switch, a stationary contact member having a pair of spaced arms, a movable switch unit comprising a shiftable member rotatably mounted on said stationary member for movement about an axis and a pair of spaced switch blades pivoted to said rotatable member for movement relative thereto about axes disposed on opposite sides of the axis of rotation of said shiftable member, said switch blades also being shiftable along their axes relative to said shiftable member, spring means carried by said shiftable member and engaging both of said switch blades for normally causing said blades to move bodily with said shiftable member about its axis of rotation until the outer ends of said switch blades engage said stationary contact member, a companion contact member also including a pair of spaced arms adapted to receive said switch blades, and means disposed adjacent each end of said switch blades whereby continued rotation of said shiftable member, after said switch blades are in position relative to said stationary contact members, will cause said switch blades to be shifted longitudinally relative to one another and the ends of the switch blades simultaneously forced into engagement with the arms of said associated contact members.

6. In a switch, a rotatable insulator, an insulator spaced therefrom and including a stationary contact jaw, a blade support fixed to said rotatable insulator, a pair of switch blades disposed generally in parallelism, separate pivot means connecting said switch blades to said switch support for movement relative thereto about and along pivot axes disposed on opposite sides of the axis of rotation of said rotatable insulator, a contact terminal carried by said blade support and accommodating pivotal movement thereof, said contact terminal having spaced arms cooperating with said switch blades, a spring carried by said blade support and engaging both blades to cause the latter to rotate with said rotatable insulator until the ends of said blades are in position relative to said stationary contact arms, and link means connected to said switch blades whereby continued motion of said rotatable insulator after said switch blades are in position in said stationary contact member acts through said oppositely disposed pivots for shifting said blades longitudinally and simultaneously forcing the ends of the blades into high pressure contact with said stationary contact member and said contact terminal with a wiping action.

7. In a switch, a pair of insulator stacks, one being rotatable, a stationary contact structure mounted on each stack, the rotatable stack being movable with respect to the contact structure mounted thereon, and a blade unit connected to said rotatable stack to move bodily therewith, said blade unit including a pair of relatively movable sections which are adapted to be disposed in a position to engage both of said stationary contacts, and means operative by the rotation of said rotatable stack relative to said blade unit for forcing the blades into high pressure engagement at their ends with both of said stationary contacts.

8. A switch comprising a stationary insulator stack having a stationary contact structure including a pair of spaced-apart contact surfaces, a rotatable insulator spaced from said stationary insulator, a second stationary contact also including spaced-apart contact surfaces and having a pivot connection with the rotatable insulator stack to accommodate movement of the latter, a switch blade unit connected with said rotatable insulator stack, said switch blade unit including a pair of spaced-apart switch blades connected together by link means, means establishing separate pivots between said switch blades and said rotatable insulator, said separator pivots being disposed on opposite sides of the pivot between the rotatable insulator and said stationary contact, means for causing both of said switch blades to rotate bodily with said rotatable insulators, and stop means on the stationary insulator stack, whereby rotation of the rotatable insulator stack after the switch blade unit engages said stop means acts through said link means to cause said switch blades to be forced into high pressure engagement with the spaced-apart contact surfaces on said two stationary contact structures.

9. In an electric switch, a pair of spaced contact means, a pair of blade members of conducting material for engaging both of said contact means, means for shifting said blade members endwise relative to one another, means actuated by said relatively endwise movement of said blade members for shifting the blade members laterally relative to one another when in final closed position for supplying contact pressure between said blade members and said two contact means, and actuating means for the switch operable in one continuous movement to move said blade members endwise relative to each other so as to shift said members laterally out of engagement with said two contact means.

10. In an electric switch, contact means, a pair of relatively movable blade members of conducting material for engaging said contact means, means for forcing said blade members, when in final closed position, against said contact means to supply high pressure contact engagement between said blade members and said contact means, latch means for holding said blade members relaxed as they enter said contact means, and means on the latter acting against said latch means for causing said blade members to be relaxed before they leave said contact means when opening the switch.

11. In a switch, in combination, a stationary contact member, a pair of relatively movable, spaced switch blades movable together into and out of position with respect to said stationary contact member, latch means for holding said blades so that they can move freely into position relative to said contact member, means acting against said switch blades for forcing them in opposite directions against said stationary member, and means on said stationary contact member to prevent said blades from leaving said stationary contact member before they have been moved away from said contact member.

12. In a switch, in combination, a stationary contact member, a pair of relatively movable, spaced switch blades movable together into and out of position with respect to said stationary contact member, latch means for holding said blades so that they move freely into position relative to said contact member, means acting against said switch blades for forcing them in opposite directions against said stationary contact member, and means on said stationary contact member and acting against said latch means for forcing said blades into their relaxed position before leaving said stationary contact member.

13. A switch comprising a swingably mounted switch blade unit having a pair of blade sections, a pair of contact structures spaced to receive opposite ends of said pair of blade sections, means for moving said sections endwise with respect to each other, and means carried by and movable with said sections for retaining the latter generally parallel with respect to each other and for shifting said sections bodily toward and away from one another and into and out of high pressure engagement with said contact structures when said first means moves said sections endwise relative to each other.

14. A switch comprising a pair of stationary contact structures, a blade unit comprising a pair of relatively movable blade sections disposed generally in parallel planes, a member mounted for rotation relative to one of said contact structures in a plane parallel to said first planes and pivoted to said sections in offset relation with respect to the axis of rotation of said member, whereby movement of said sections with said member swings the sections into and out of position with respect to said stationary contact structures and movement of said member relative to said sections after the latter are in position adjacent said contact structures shifts said sections endwise with respect to each other, and links disposed in planes generally at right angles relative to said first planes and connected to said sections whereby said sections are retained in generally parallel relation and relative endwise movement thereof shifts said sections bodily toward and away from each other and into and out of high pressure engagement with said contact structure at both ends of said sections.

PEDER B. HOYE.